(12) United States Patent
Nakajima

(10) Patent No.: US 11,921,892 B2
(45) Date of Patent: Mar. 5, 2024

(54) DATA ASSOCIATION SYSTEM AND ANONYMIZATION CONTROL SYSTEM

(71) Applicant: KYOCERA Document Solutions Inc., Osaka (JP)

(72) Inventor: Koki Nakajima, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 440 days.

(21) Appl. No.: 17/205,328

(22) Filed: Mar. 18, 2021

(65) Prior Publication Data
US 2021/0303727 A1    Sep. 30, 2021

(30) Foreign Application Priority Data

Mar. 25, 2020   (JP) ................................ 2020-055180

(51) Int. Cl.
*G06F 21/62*   (2013.01)
*G06F 3/06*   (2006.01)

(52) U.S. Cl.
CPC ........ *G06F 21/6254* (2013.01); *G06F 3/0604* (2013.01); *G06F 3/0652* (2013.01); *G06F 3/0673* (2013.01)

(58) Field of Classification Search
CPC .. G06F 21/6254; G06F 3/0604; G06F 3/0652; G06F 3/0673; G06F 3/0658
See application file for complete search history.

(56) References Cited

U.S. PATENT DOCUMENTS

| | | | |
|---|---|---|---|
| 9,767,488 B1 * | 9/2017 | Wang ................. | G06Q 30/0275 |
| 10,382,554 B1 * | 8/2019 | Danilov ................. | G06F 3/061 |
| 10,643,002 B1 * | 5/2020 | Veselov .................. | G06F 21/00 |
| 10,817,621 B2 | 10/2020 | Takahashi et al. | |
| 11,550,955 B1 * | 1/2023 | Chen ................... | G06F 21/6254 |
| 2016/0188253 A1 * | 6/2016 | Resch ................... | G06F 3/0647 711/172 |
| 2019/0303610 A1 * | 10/2019 | Bodegas Martinez ...... | G06F 16/152 |
| 2020/0160511 A1 * | 5/2020 | Lyman .................. | G06T 11/006 |
| 2021/0216537 A1 * | 7/2021 | McCray ................ | G06F 16/244 |
| 2021/0256159 A1 * | 8/2021 | Ninglekhu .............. | H04W 4/70 |
| 2022/0126864 A1 * | 4/2022 | Moustafa .......... | G08G 1/096758 |

FOREIGN PATENT DOCUMENTS

| | | |
|---|---|---|
| JP | 2006-236264 | 9/2006 |
| JP | 2016139261 | 8/2016 |
| JP | 2019-046036 | 3/2019 |
| JP | 2019-144723 | 8/2019 |

OTHER PUBLICATIONS

JPO, Office Action of JP 2020-055180 dated Nov. 29, 2023.

* cited by examiner

*Primary Examiner* — Mohammed Waliullah
(74) *Attorney, Agent, or Firm* — LEX IP MEISTER, PLLC

(57) ABSTRACT

A data association system includes a POST connector which collects data maintained in an information system a pipeline which stores the data collected by the POST connector; and a pipeline orchestrator which controls anonymization of the data stored by the pipeline. the data association system is characterized in that the pipeline executes anonymization processing of anonymizing the data, the POST connector and the pipeline store data before being anonymized by the anonymization processing, and the pipeline orchestrator instructs, after execution of the anonymization processing, the POST connector and the pipeline to delete the data before being anonymized.

3 Claims, 5 Drawing Sheets

DATA ASSOCIATION SYSTEM AND ANONYMIZATION CONTROL SYSTEM

INCORPORATION BY REFERENCE

This application is based upon, and claims the benefit of priority from, corresponding Japanese Patent Application No. 2020-055180 filed in the Japan Patent Office on Mar. 25, 2020, the entire contents of which are incorporated herein by reference.

BACKGROUND

Field of the Invention

The present disclosure relates to a data association system which collects and stores data maintained in an information system, and to an anonymization control system.

Description of Related Art

Typically, a technique for anonymizing data is known.

SUMMARY

A data association system of the present disclosure includes a data collection system which collects data maintained in an information system, a data storage system which stores the data collected by the data collection system, and an anonymization control system which controls anonymization of the data stored by the data storage system, and is characterized in that the data storage system executes anonymization processing of anonymizing the data. At least one of the data collection system and the data storage system stores data before being anonymized by the anonymization processing. The anonymization control system instructs, after execution of the anonymization processing, one of the data collection system and the data storage system which stores the data before being anonymized to delete the data before being anonymized.

An anonymization control system of the present disclosure pertains to an anonymization control system which controls anonymization of data stored by a data storage system that stores data, which is collected by a data collection system that collects data maintained in an information system, and is characterized in that the data storage system executes anonymization processing of anonymizing the data. At least one of the data collection system and the data storage system stores data before being anonymized by the anonymization processing. The anonymization control system instructs, after execution of the anonymization processing, one of the data collection system and the data storage system which stores the data before being anonymized to delete the data before being anonymized.

DETAILED DESCRIPTION

In the following, embodiments of the present disclosure will be described with reference to the accompanying drawings.

First, a configuration of a system according to one embodiment of the present disclosure will be described.

Figure 1:
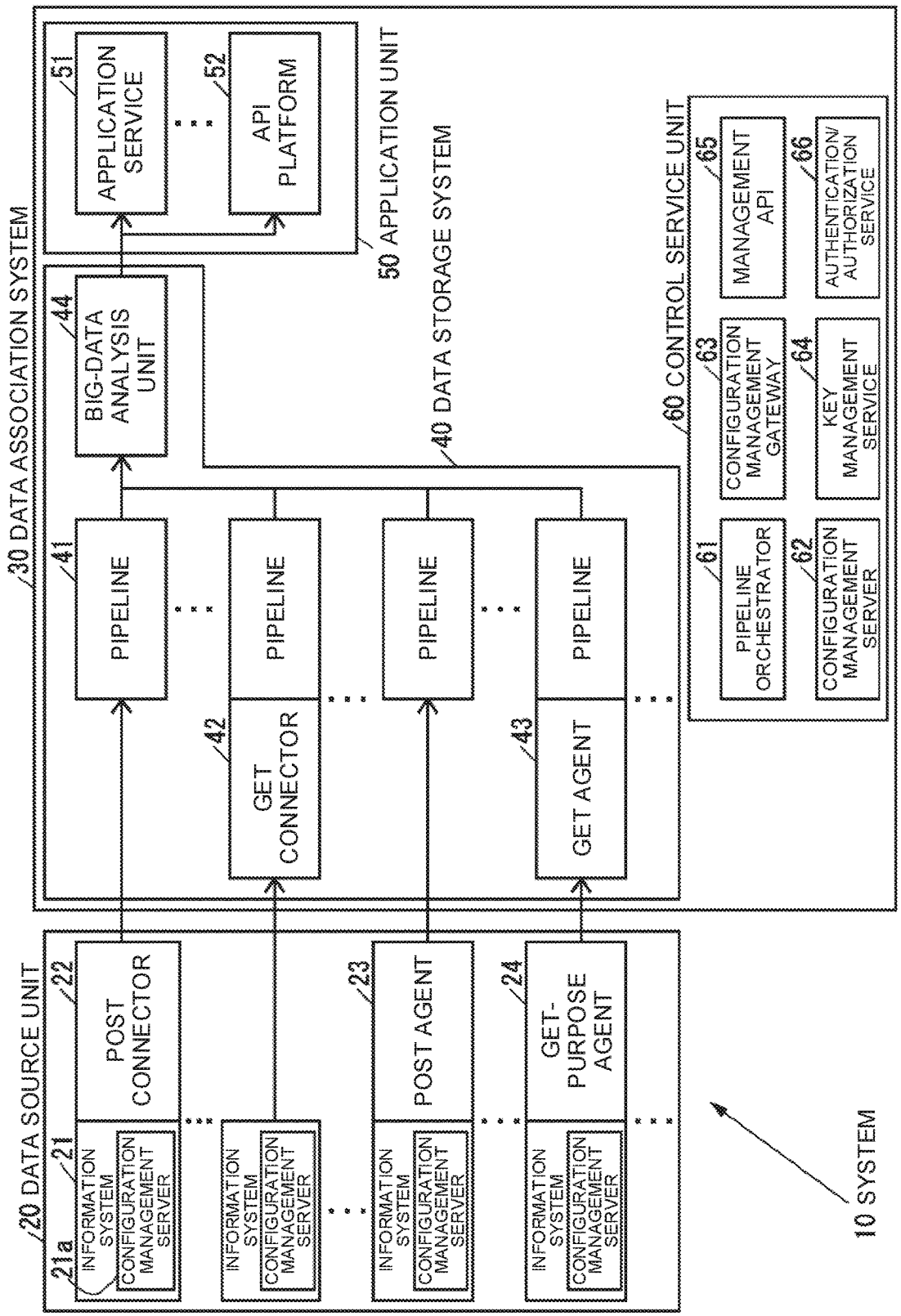
FIG. 1 is a block diagram of a system according to one embodiment of the present disclosure.

FIG. 1 is a block diagram of a system 10 according to the present embodiment.

As illustrated in FIG. 1, the system 10 includes a data source unit 20 which produces data, and a data association system 30 which associates the data produced by the data source unit 20.

The data source unit 20 includes an information system 21 which produces data. The information system 21 includes a configuration management server 21a which saves the configuration and the settings of the information system 21. The data source unit 20 may also include, in addition to the information system 21, at least one information system. Examples of the information system include an Internet-of-Things (IoT) system such as a remote management system, which remotely manages an image forming apparatus such as a multifunction peripheral (MFP) or a print-only machine, and an in-house system such as an enterprise resource planning (ERP) system or a production management system. Each of the information systems may be configured by a single computer, or may be configured by multiple computers. The information system may have a file of structured data maintained therein. The information system may have a file of unstructured data maintained therein. The information system may have a database of structured data maintained therein.

The data source unit 20 includes a POST connector 22, which serves as a data collection system, for acquiring a file of structured data or unstructured data that is maintained in the information system, and transmitting the acquired file to a pipeline, which will be described later, of the data association system 30. The data source unit 20 may also include, besides the POST connector 22, at least one POST connector having the configuration similar to that of the POST connector 22. The POST connector may be configured by a computer in which the POST connector itself constitutes the information system from which the file is acquired. Note that the POST connector is also a component of the data association system 30.

The data source unit 20 includes a POST agent 23, which serves as a data collection system, for acquiring structured data from a database of the structured data that is maintained in the information system, and transmitting the acquired structured data to a pipeline, which will be described later, of the data association system 30. The data source unit 20 may also include, besides the POST agent 23, at least one POST agent having the configuration similar to that of the POST agent 23. The POST agent may be configured by a computer in which the POST agent itself constitutes the information system from which the structured data is acquired. Note that the POST agent is also a component of the data association system 30.

The data source unit 20 includes a GET-purpose agent 24, which serves as a data collection system, for generating structured data for association on the basis of the data maintained in the information system. The data source unit 20 may also include, besides the GET-purpose agent 24, at least one GET-purpose agent having the configuration similar to that of the GET-purpose agent 24. The GET-purpose agent may be configured by a computer which constitutes the information system maintaining the data from which the structured data for association is generated. Note that the GET-purpose agent is also a component of the data association system 30.

The data association system 30 includes a data storage system 40 which stores data produced by the data source unit 20, an application unit 50 which uses the data stored in the data storage system 40, and a control service unit 60 which executes various kinds of control over the data storage system 40 and the application unit 50.

The data storage system 40 includes a pipeline 41 which stores the data produced by the data source unit 20. The data storage system 40 may also include, in addition to the pipeline 41, at least one pipeline. Since the configurations of data in the information systems may differ for each information system, the data storage system 40 basically includes a pipeline for each information system. Each of the pipelines may be configured by a single computer, or may be configured by multiple computers.

A data storage system 40 includes a GET connector 42, which serves as a data collection system, for acquiring a file of structured data or unstructured data that is maintained in an information system, and associating the acquired file with a pipeline. The data storage system 40 may also include, besides the GET connector 42, at least one GET connector having the configuration similar to that of the GET connector 42. The GET connector may be configured by a computer in which the GET connector itself constitutes the pipeline with which the file is associated.

Note that in the system 10, the data source unit 20 is provided with the POST connector to be adapted to the information system which does not allow a file of structured data or unstructured to be acquired from the data storage system 40. Meanwhile, in the system 10, the data storage system 40 is provided with the GET connector to be adapted to the information system which allows a file of structured data or unstructured data to be acquired from the data storage system 40.

The data storage system 40 includes a GET agent 43, which serves as a data collection system, for acquiring the structured data generated by the GET-purpose agent, and associating the acquired structured data with the pipeline. The data storage system 40 may also include, besides the GET agent 43, at least one GET agent having the configuration similar to that of the GET agent 43. The GET agent may be configured by a computer in which the GET agent itself constitutes the pipeline with which the structured data is associated.

Note that in the system 10, the data source unit 20 is provided with the POST agent to be adapted to the information system which does not allow structured data to be acquired from the data storage system 40. Meanwhile, in the system 10, the data source unit 20 is provided with the GET-purpose agent, and the data storage system 40 is provided with the GET agent to be adapted to the information system which allows structured data to be acquired from the data storage system 40.

The data storage system 40 includes the big-data analysis unit 44, which serves as a data conversion system, for executing final conversion processing as data conversion processing of converting the data stored by a plurality of pipelines into a form that can be counted or searched by a query language, i.e., a database language such as SQL, for example. The big-data analysis unit 44 can also execute a search or counting in response to a search request or counting request from the application unit 50 for the data on which the final conversion processing is executed. The big-data analysis unit 44 may be configured by a single computer, or may be configured by multiple computers.

The final conversion processing may include data integration processing of integrating data of a plurality of information systems as the data conversion processing. In a case where the system 10 includes, as the information systems, a remote management system disposed in Asia for remotely managing a large number of image forming apparatuses disposed in Asia, a remote management system disposed in Europe for remotely managing a large number of image forming apparatuses disposed in Europe, and a remote management system disposed in the U.S. for remotely managing a large number of image forming apparatuses disposed in the U.S., each of these three remote management systems has a device management table for management of the image forming apparatuses that the remote management system itself manages. The device management table corresponds to information indicating various kinds of information of the image forming apparatus in association with an ID assigned to each of the image forming apparatuses. Here, since each of the three remote management systems has the device management table of its own individually, it is possible that the same ID will be assigned to different image forming apparatuses among the device management tables of the three remote management systems. Therefore, when the big-data analysis unit 44 integrates the device management tables of the three remote management systems to generate a single device management table, the big-data analysis unit 44 reassigns the IDs of the image forming apparatuses so as to avoid duplication of the IDs.

An application unit 50 includes an application service 51 which uses the data managed by a big-data analysis unit 44 to execute a specific operation instructed by the user, such as display of data and analysis of data. The application unit 50 may also include, in addition to the application service 51, at least one application service. Each of the application services may be configured by a single computer, or may be configured by multiple computers.

The application unit 50 includes an API platform 52 which provides an Application Programming Interface (API) that uses the data managed by the big-data analysis unit 44 and executes a specific operation. The API platform 52 may be configured by a single computer, or may be configured by multiple computers. For example, the APIs to be provided by the API platform 52 include an API which sends, to a consumable ordering system, which is a system outside the system 10, for ordering consumables when the remaining amount of a consumable such as a toner of the image forming apparatus is less than or equal to a specific amount, data on the remaining amount of the consumables collected from the image forming apparatus by means of the remote management system, and an API which sends, to a trouble prediction system, which is a system outside the system 10, for predicting a trouble of the image forming apparatus, various kinds of data collected from the image forming apparatus by means of the remote management system.

A control service unit 60 includes a pipeline orchestrator 61, which serves as a processing monitoring system, for monitoring the processing at each stage to be carried out for the data in a data source unit 20, the data storage system 40, and the application unit 50. The pipeline orchestrator 61 may be configured by a single computer, or may be configured by multiple computers. The pipeline orchestrator 61 controls anonymization of the data stored by the data storage system 40, and constitutes an anonymization control system of the present disclosure.

The control service unit 60 includes a configuration management server 62 which saves the configuration and the settings of the data storage system 40, and automatically executes deployment as needed. The configuration management server 62 may be configured by a single computer, or may be configured by multiple computers. The configuration management server 62 constitutes a configuration change system which changes the configuration of the data association system 30.

The control service unit 60 includes a configuration management gateway 63 which connects to the configuration management server of the information system, and collects information for detecting a change in the configuration related to the database or unstructured data in the information system, in other words, a change in the configuration of data in the information system. The configuration management gateway 63 may be configured by a single computer, or may be configured by multiple computers.

The control service unit 60 includes a Key management service 64 which encrypts and stores security information, such as key information and connect strings, necessary for achieving association between the respective systems such as the information systems. The Key management service 64 may be configured by a single computer, or may be configured by multiple computers.

The control service unit 60 includes a management API 65 which accepts requests from the data storage system 40 and the application unit 50. The management API 65 may be configured by a single computer, or may be configured by multiple computers.

The control service unit 60 includes an authentication/authorization service 66 which executes authentication/authorization of the application service of the application unit 50. The authentication/authorization service 66 may be configured by a single computer, or may be configured by multiple computers. The authentication/authorization service 66 can confirm, for example, whether the application service is permitted to request the data of the information system that is stored in the data storage system 40 to be updated to the latest data.

Next, the operation of the system 10 will be described.

First, an operation of a system 10 to be performed in a case where data maintained in an information system 21 is anonymized by a pipeline 41 and is stored by the big-data analysis unit 44 will be described.

Figure 2:
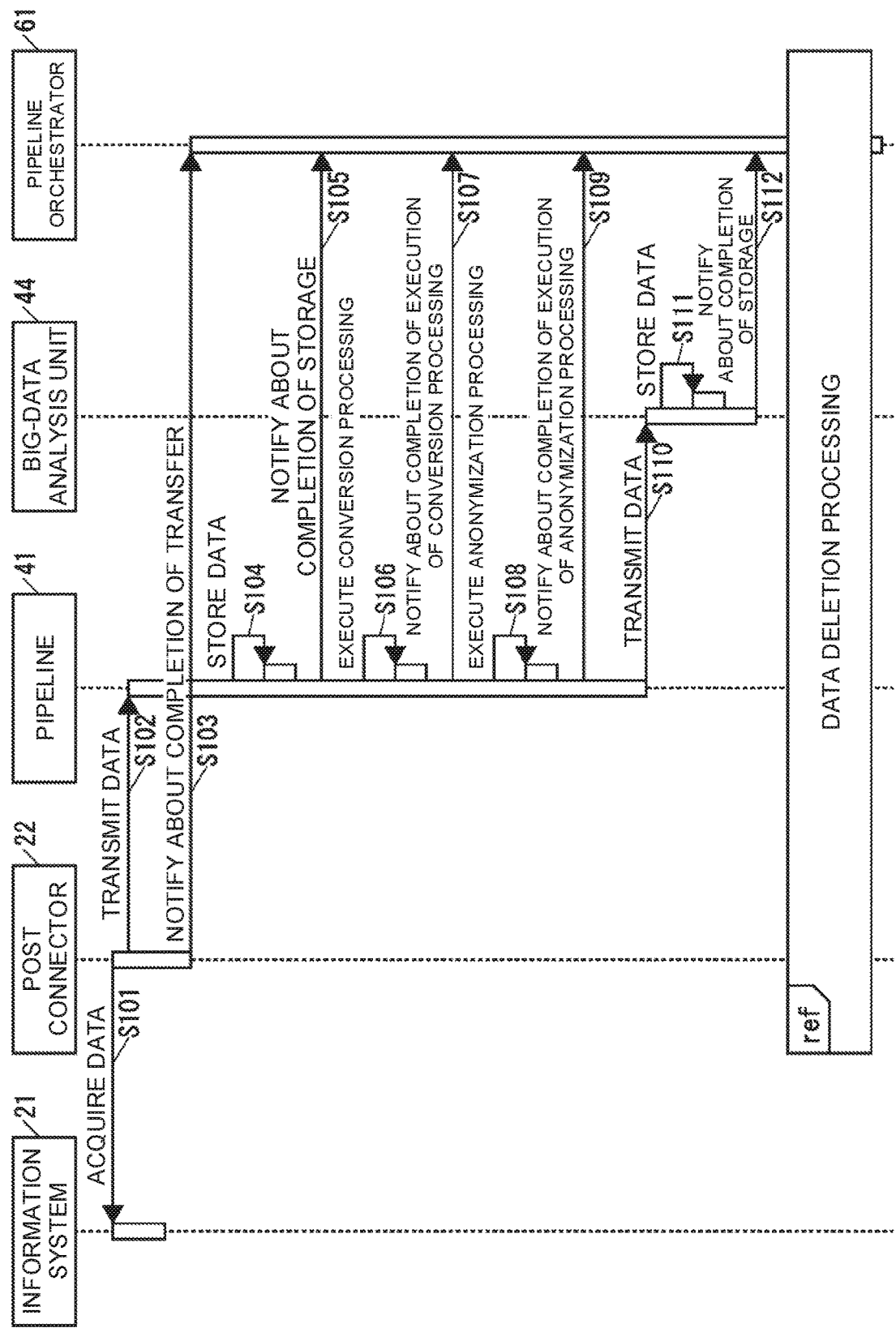
FIG. 2 is a sequence diagram of an operation of the system illustrated in FIG. 1 to be performed in a case where data maintained in an information system is anonymized by a pipeline and is stored by a big-data analysis unit.
Figure 3:
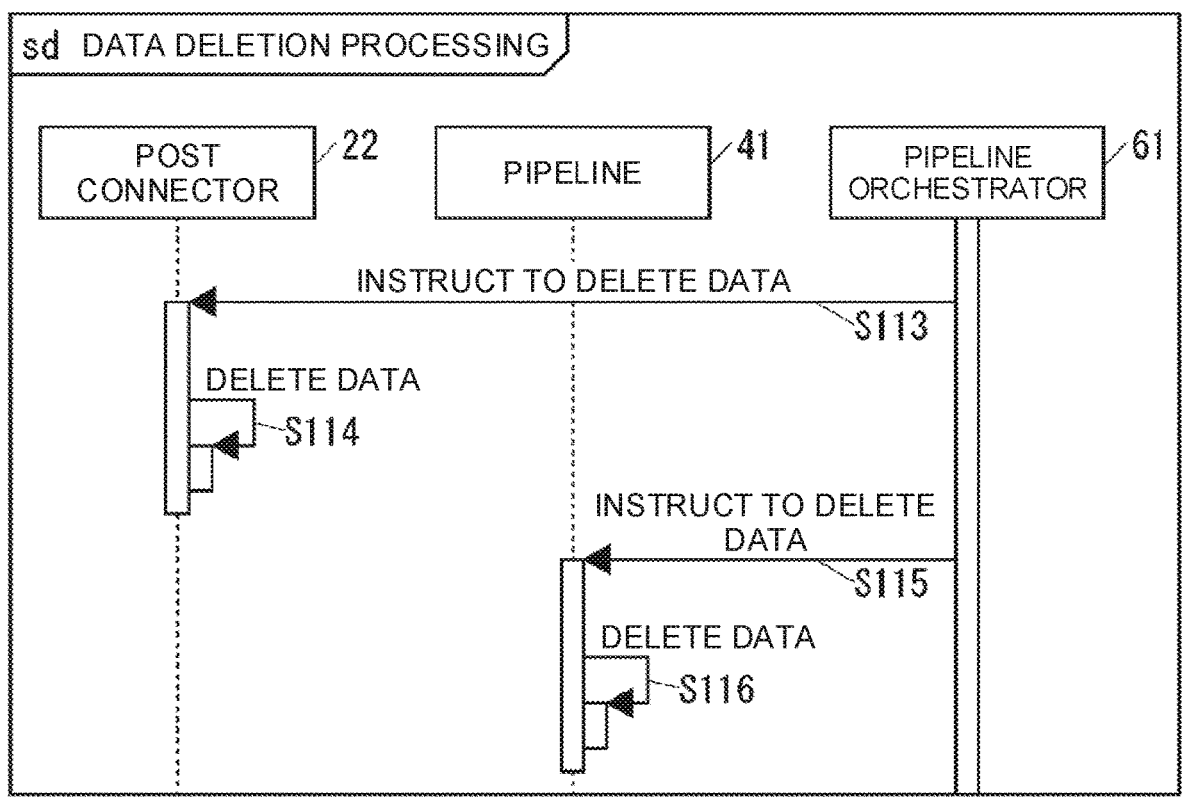
FIG. 3 is a sequence diagram of "data deletion processing" indicated in FIG. 2.

FIG. 2 is a sequence diagram of the operation of the system 10 to be performed in a case where the data maintained in the information system 21 is anonymized by the pipeline 41 and is stored by the big-data analysis unit 44. FIG. 3 is a sequence diagram of "data deletion processing" indicated in FIG. 2.

As illustrated in FIGS. 2 and 3, a POST connector 22 acquires the data maintained in the information system 21 from the information system 21 (S101), and transmits the data acquired in S101 to the pipeline 41 (S102). That is, the POST connector 22 transfers the data maintained in the information system 21 from the information system 21 to the pipeline 41.

When the POST connector 22 completes the transfer of data from the information system 21 to the pipeline 41, the POST connector 22 notifies the pipeline orchestrator 61 of the completion of the transfer of data from the information system 21 to the pipeline 41 (S103).

In the pipeline 41, when the data is transmitted from the POST connector 22 in S102, the pipeline 41 stores the data which has been transmitted from the POST connector 22 in S102 (S104).

In the pipeline 41, when the storage of the data of S104 is completed, the pipeline 41 notifies the pipeline orchestrator 61 of the completion of the storage of the data which has been transmitted from the POST connector 22 (S105).

In the pipeline 41, when the storage of the data of S104 is completed, the pipeline 41 executes conversion processing of converting the format of the data which has been transferred from the information system 21 in S102 into a format for storage by the big-data analysis unit 44 (S106).

In the pipeline 41, when the execution of the conversion processing of S106 is completed, the pipeline 41 notifies the pipeline orchestrator 61 of the completion of the execution of the conversion processing (S107).

In the pipeline 41, when the execution of the conversion processing of S106 is completed, the pipeline 41 executes anonymization processing of anonymizing personal information on data for which the conversion processing has been executed in S106 (S108). In the above, the anonymization processing refers to processing of converting, for personal information which would prohibit normal execution of the other processing if deleted, to convert the personal information into information that is hard to identify the personal information, and to processing of deleting, for personal information which would not prohibit normal execution of the other processing even if deleted, to delete the personal information.

In the pipeline 41, when the execution of the anonymization processing of S108 is completed, the pipeline 41 notifies the pipeline orchestrator 61 of the completion of the execution of the anonymization processing (S109).

In the pipeline 41, when the execution of the anonymization processing of S108 is completed, the pipeline 41 transmits the data for which the anonymization processing has been executed in S108 to the big-data analysis unit 44 (S110).

In the big-data analysis unit 44, when the data is transmitted from the pipeline 41 in S110, the big-data analysis unit 44 stores the data transmitted from the pipeline 41 in S110 (S111).

In the big-data analysis unit 44, when the storage of the data of S111 is completed, the big-data analysis unit 44 notifies the pipeline orchestrator 61 of the completion of the storage of the data which has been transmitted from the pipeline 41 (S112).

When the pipeline orchestrator 61 receives the notification of S112, the pipeline orchestrator 61 instructs the POST connector 22 to delete the data which has been temporarily stored in the POST connector 22 in order to have the anonymized data stored in the big-data analysis unit 44 (S113).

When the POST connector 22 receives the instruction of S113, the POST connector 22 deletes all of the data which has been temporarily stored in the POST connector 22 itself in order to have the anonymized data stored in the big-data analysis unit 44 (S114). For example, in a case where the POST connector 22 stores in the POST connector 22 itself the data that the POST connector 22 has transferred from the information system 21 to the pipeline 41, the POST connector 22 deletes such data.

After performing the processing of S113, the pipeline orchestrator 61 instructs the pipeline 41 to delete the temporary data which has been stored in the pipeline 41 to store the data in the big-data analysis unit 44 (S115).

When the pipeline 41 receives the instruction of S115, the pipeline 41 deletes all of the data which has been temporarily stored in the pipeline 41 itself in order to have the anonymized data stored in the big-data analysis unit 44 (S116). For example, the pipeline 41 deletes the data stored in S104, the data for which the conversion processing has been executed in S106, and the data for which the anonymization processing has been executed in S108.

Next, the operation of the system 10 to be performed in a case where an error has occurred in the anonymization processing, in a series of steps of processing in which the data maintained in the information system 21 is anonymized by the pipeline 41 and is stored by the big-data analysis unit 44, will be described.

Figure 4:
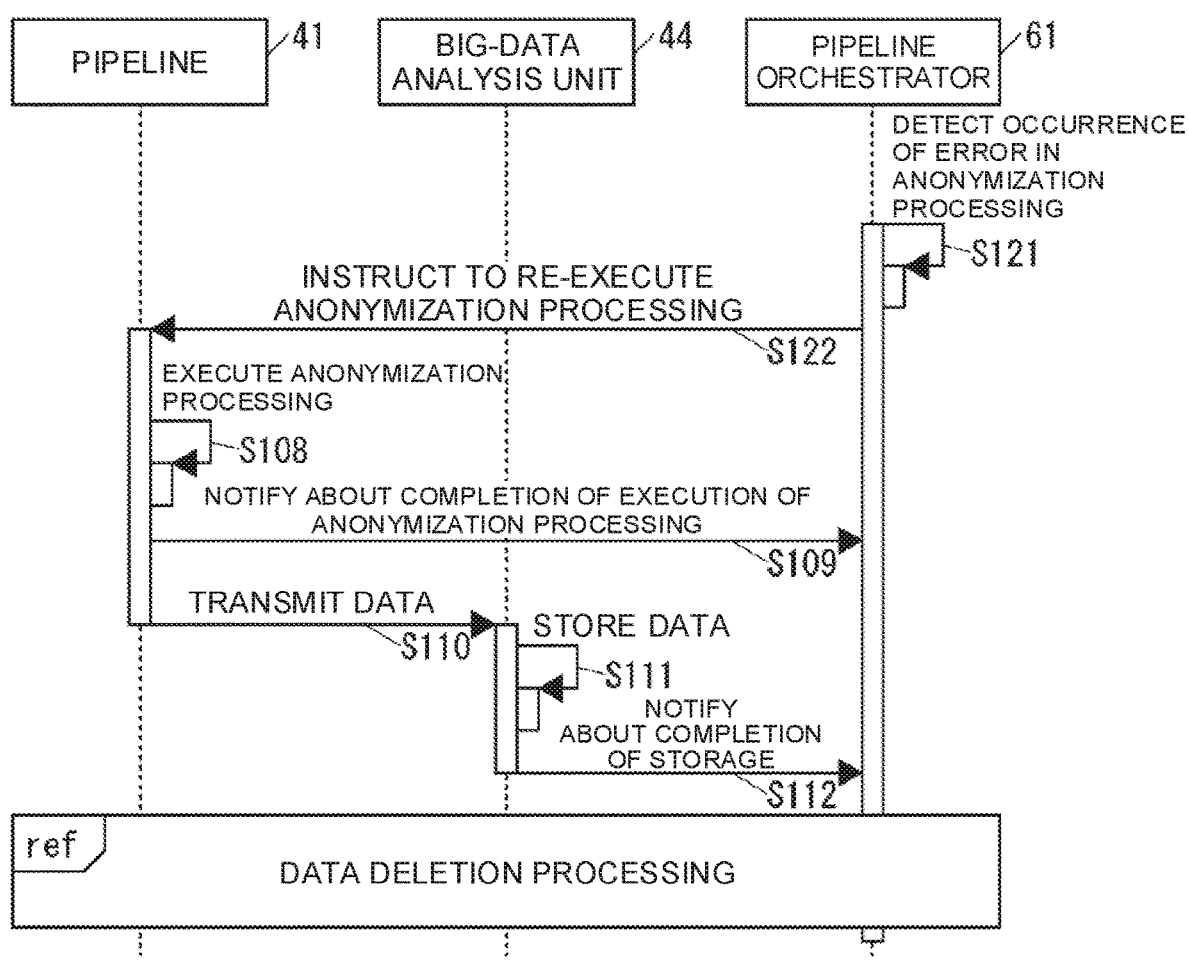
FIG. 4 is a sequence diagram of an operation of the system illustrated in FIG. 1 to be performed in a case where an error has occurred in anonymization processing, in processing in which data maintained in an information system is anonymized by a pipeline and is stored by a big-data analysis unit.

FIG. 4 is a sequence diagram of the operation of the system 10 to be performed in a case where an error has occurred in the anonymization processing, in a series of steps of processing in which the data maintained in the information system 21 is anonymized by the pipeline 41 and is stored by the big-data analysis unit 44.

When the pipeline orchestrator 61 detects that an error has occurred in the anonymization processing of S108 indicated in FIG. 2 (S121), the pipeline orchestrator 61 instructs the pipeline 41 to re-execute the anonymization processing (S122).

Therefore, the system 10 executes the processing of S108 to S116 indicated in FIGS. 2 and 3.

In the above, the case where an error has occurred in the anonymization processing, which is in a series of steps of processing in which the data maintained in the information system 21 is anonymized by the pipeline 41 and is stored by the big-data analysis unit 44, has been described. However, the same applies to a case where an error has occurred in certain processing, which is in a series of steps of processing in which the data maintained in the information system 21 is anonymized by the pipeline 41 and is stored by the big-data analysis unit 44. That is, as in the case where an error has occurred in the anonymization processing, the pipeline orchestrator 61 instructs a constituent element in which the error has occurred to re-execute the processing from the processing in which the error has occurred.

Next, the operation of the system 10 to be performed when an error is not resolved, in a case where the error has occurred in the anonymization processing, in a series of steps of processing in which the data maintained in the information system 21 is anonymized by the pipeline 41 and is stored by the big-data analysis unit 44, will be described.

Figure 5:
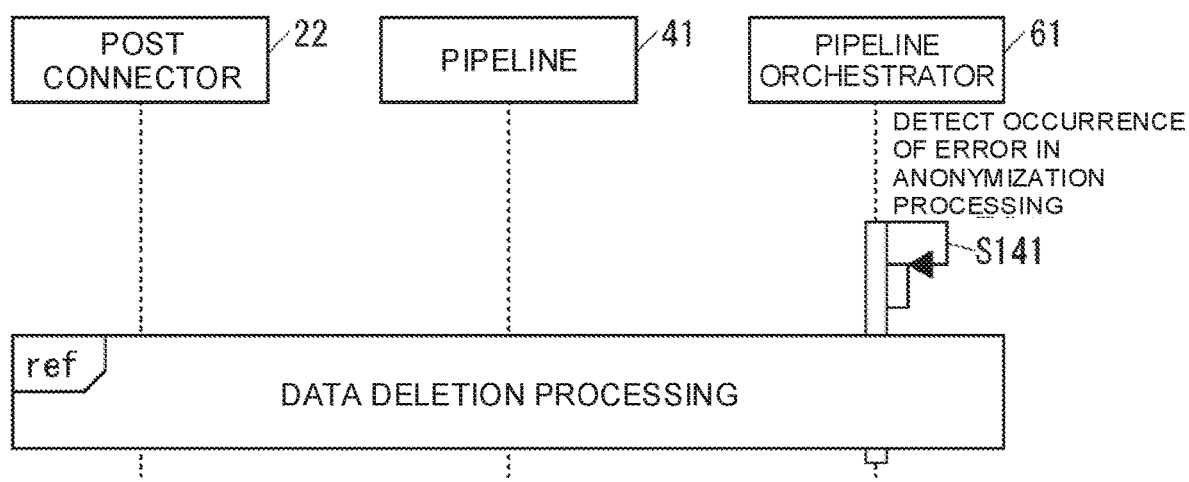
FIG. 5 is a sequence diagram of an operation of the system illustrated in FIG. 1 to be performed when an error is not resolved, in a case where the error has occurred in anonymization processing, in processing in which data maintained in an information system is anonymized by a pipeline and is stored by a big-data analysis unit.

FIG. 5 is a sequence diagram of the operation of the system 10 to be performed when an error is not resolved, in a case where the error has occurred in the anonymization processing, in series of steps of processing in which the data maintained in the information system 21 is anonymized by the pipeline 41 and is stored by the big-data analysis unit 44.

As illustrated in FIG. 5, if the pipeline orchestrator 61 detects, after executing the operation of instructing the pipeline 41 to re-execute the anonymization processing for a specified number of times upon detection of occurrence of an error in the anonymization processing, that an error has occurred in the anonymization processing (S141), the pipeline orchestrator 61 instructs the POST connector 22 to delete the data which has been temporarily stored in the POST connector 22 in order to have the anonymized data stored in the big-data analysis unit 44 (S113).

When the POST connector 22 receives the instruction of S113, the POST connector 22 deletes all of the data which has been temporarily stored in the POST connector 22 itself in order to have the anonymized data stored in the big-data analysis unit 44 (S114). For example, in a case where the POST connector 22 stores in the POST connector 22 itself the data that the POST connector 22 has transferred from the information system 21 to the pipeline 41, the POST connector 22 deletes such data.

When the pipeline orchestrator 61 receives the notification concerning S114, the pipeline orchestrator 61 instructs the pipeline 41 to delete the temporary data which has been stored in the pipeline 41 to store the data in the big-data analysis unit 44 (S115).

When the pipeline 41 receives the instruction of S115, the pipeline 41 deletes all of the data which has been temporarily stored in the pipeline 41 itself in order to have the anonymized data stored in the big-data analysis unit 44 (S116). For example, the pipeline 41 deletes the data stored in S104, and the data for which the conversion processing has been executed in S106.

In the above, the case where an error is not resolved in the anonymization processing, which is in a series of steps of processing of anonymizing the data maintained in the information system 21 by the pipeline 41, and stored by the big-data analysis unit 44, has been described. However, the same applies to a case where an error is not resolved in certain processing, which is in a series of steps of processing of anonymizing the data maintained in the information system 21 by the pipeline 41, and storing the anonymized data by the big-data analysis unit 44. That is, as in the case where an error is not resolved in the anonymization processing, the pipeline orchestrator 61 instructs a constituent element, which stores such data that has been temporarily stored therein in order to have the anonymized data stored in the big-data analysis unit 44, to delete the stored data.

In the above, the case where the data maintained in the information system 21 is transferred to the pipeline 41 via the POST connector 22, and is thereafter anonymized by the pipeline 41 and stored by the big-data analysis unit 44 has been described. However, the same applies to a case where the data maintained in the information system is transferred to a pipeline via the GET connector 42, and is thereafter anonymized by the aforementioned pipeline and stored by the big-data analysis unit 44, a case where the data maintained in the information system is transferred to a pipeline via a POST agent 23, and is thereafter anonymized by the aforementioned pipeline and stored by the big-data analysis unit 44, and a case where the data maintained in the information system is transferred to a pipeline via a GET-purpose agent 24 and a GET agent 43, and is thereafter anonymized by the aforementioned pipeline and stored by the big-data analysis unit 44.

As described above, in a data association system 30, the pipeline orchestrator 61 instructs, after execution of the anonymization processing by the data storage system 40, one of the data collection system and the data storage system 40 which stores data before being anonymized to delete the data before being anonymized, as shown in FIGS. 2 and 3 (S113 and S115). Therefore, the data before being anonymized can be deleted appropriately.

In the data association system 30, when an error has occurred in processing prior to the anonymization processing or in the anonymization processing, the pipeline orchestrator 61 instructs one of the data collection system and the data storage system 40 which has been executing the processing in question to re-execute the processing from the processing in question (S122). Therefore, since the processing can be re-executed with the use of the data before being anonymized, which is stored in at least one of the data collection system and the data storage system 40, the processing can thereby be efficiently re-executed.

In the data association system 30, as shown in FIGS. 5 and 3, in a case where an error has occurred in processing prior to the anonymization processing or in the anonymization processing, and the error is not resolved even by re-executing the processing from the processing in question for a specified number of times, the pipeline orchestrator 61 instructs one of the data collection system and the data storage system 40 which stores data before being anonymized to delete the data before being anonymized (S113 and S115). Therefore, the data before being anonymized can be deleted appropriately.

In the data association system 30, the data stored by the big-data analysis unit 44 is anonymized Therefore, it is possible to ensure to a user who uses the data being stored by the big-data analysis unit 44 that the data does not include personal information. Further, in the data association system 30, when the anonymized data has been stored by the big-data analysis unit 44, the data before being anonymized is appropriately deleted. Therefore, it is possible to ensure to a provider who has provided the data that personal information of the provider himself/herself is anonymized, and the data before being anonymized is no longer left.

What is claimed is:

1. A data association system comprising:
   a data collection system which collects data maintained in an information system;
   a data storage system which stores the data collected by the data collection system; and
   an anonymization control system which controls anonymization of the data stored by the data storage system, wherein
   the data storage system executes anonymization processing of anonymizing the data,
   at least one of the data collection system and the data storage system stores data before being anonymized by the anonymization processing,
   the anonymization control system instructs, after execution of the anonymization processing, one of the data collection system and the data storage system which stores the data before being anonymized to delete the data before being anonymized, and
   the anonymization control system instructs, when an error has occurred in processing prior to the anonymization processing or in the anonymization processing, one of the data collection system and the data storage system which has been executing the processing to perform re-execution of processing from the processing.

2. The data association system according to claim 1, wherein the anonymization control system instructs, when the error is not resolved by the re-execution performed for a specified number of times, one of the data collection system and the data storage system which stores the data before being anonymized to delete the data before being anonymized.

3. An anonymization control system which controls anonymization of data stored by a data storage system that stores data, which is collected by a data collection system that collects data maintained in an information system, in which
   the data storage system executes anonymization processing of anonymizing the data,
   at least one of the data collection system and the data storage system stores data before being anonymized by the anonymization processing,
   the anonymization control system instructs, after execution of the anonymization processing, one of the data collection system and the data storage system which stores the data before being anonymized to delete the data before being anonymized, and
   the anonymization control system instructs, when an error has occurred in processing prior to the anonymization processing or in the anonymization processing, one of the data collection system and the data storage system which has been executing the processing to perform re-execution of processing from the processing.

* * * * *